(12) United States Patent
Liggett et al.

(10) Patent No.: US 8,524,621 B2
(45) Date of Patent: Sep. 3, 2013

(54) METALLIZED FLEXIBLE LAMINATE MATERIAL FOR LIGHTER-THAN-AIR VEHICLES

(75) Inventors: Paul E. Liggett, Wooster, OH (US);
Dennis L. Carter, Hudson, OH (US);
Anthony L. Dunne, Hudson, OH (US);
Dhiraj H. Darjee, Wadsworth, OH (US);
Gerald W. Placko, Medina, OH (US);
James I. Mascolino, North Canton, OH (US); Lowell J. McEowen, Louisville, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 653 days.

(21) Appl. No.: 11/991,499

(22) PCT Filed: Sep. 20, 2006

(86) PCT No.: PCT/US2006/036528
§ 371 (c)(1),
(2), (4) Date: Mar. 4, 2008

(87) PCT Pub. No.: WO2007/038097
PCT Pub. Date: Apr. 5, 2007

(65) Prior Publication Data
US 2009/0042037 A1    Feb. 12, 2009

Related U.S. Application Data

(63) Continuation-in-part of application No. 11/231,569, filed on Sep. 21, 2005, now abandoned.

(51) Int. Cl.
*B32B 27/12* (2006.01)
*B32B 15/14* (2006.01)
*B32B 27/32* (2006.01)
*B29D 22/02* (2006.01)
*B64B 1/00* (2006.01)

(52) U.S. Cl.
USPC ........... 442/131; 442/130; 442/132; 442/236; 442/378; 442/394; 442/397; 428/35.8; 428/35.9; 428/36.1; 244/30

(58) Field of Classification Search
USPC ............. 442/82–92, 228–234, 316, 317, 394, 442/396, 397; 244/24–33; 428/35.8, 35.9, 428/36.1; 8/648
See application file for complete search history.

(56) References Cited

U.S. PATENT DOCUMENTS 3,127,135 A    3/1964  Burr et al. ...................... 244/126
3,257,266 A    6/1966  Sapper .......................... 161/188
(Continued)

FOREIGN PATENT DOCUMENTS

CA    1071083        2/1980
DE    2635114    *   2/1978
(Continued)

OTHER PUBLICATIONS

Office Action of Mar. 3, 2010 in U.S. Appl. No. 11/443,327.
(Continued)

*Primary Examiner* — Jennifer A Steele
(74) *Attorney, Agent, or Firm* — Renner Kenner Greive Bobak Taylor & Weber

(57) ABSTRACT

A laminate material for lighter-than-air vehicles includes at least one monofilament yarn layer, a polymeric film layer adjacent to the at least one monofilament layer, and a metallized coating adjacent to said polymeric film layer. A clear film cover layer may be adhered to the metallized coating, and one or more fluorescent dyes may be incorporated into the clear film layer.

35 Claims, 3 Drawing Sheets

(56) References Cited

U.S. PATENT DOCUMENTS

| | | | |
|---|---|---|---|
| 3,519,530 A * | 7/1970 | Struble, Jr. | 428/152 |
| 3,744,744 A * | 7/1973 | Cobb | 244/32 |
| 3,791,611 A | 2/1974 | Babbidge | 244/153 |
| 3,791,909 A | 2/1974 | McKee | 156/306 |
| 3,900,662 A | 8/1975 | Yuan | 428/252 |
| 3,974,989 A | 8/1976 | Goodfellow | 244/126 |
| 4,020,209 A | 4/1977 | Yuan | 428/257 |
| 4,181,768 A | 1/1980 | Severin | 428/252 |
| 4,241,128 A | 12/1980 | Wang | 428/212 |
| 4,308,370 A | 12/1981 | Fukada et al. | 526/255 |
| 4,311,615 A | 1/1982 | Taylor et al. | 252/514 |
| 4,340,786 A | 7/1982 | Tester | 179/110 A |
| 4,444,822 A | 4/1984 | Doyle et al. | 428/109 |
| 4,560,608 A * | 12/1985 | Pusch et al. | 428/196 |
| 4,779,166 A * | 10/1988 | Tanaka et al. | 362/629 |
| 4,836,128 A | 6/1989 | Walker | 716/210 |
| 5,118,558 A | 6/1992 | Mater et al. | 428/252 |
| 5,606,003 A * | 2/1997 | Wang et al. | 528/60 |
| 5,837,623 A | 11/1998 | Howland | 442/189 |
| 5,939,340 A | 8/1999 | Gabbay | 442/229 |
| 6,013,688 A | 1/2000 | Pacheco et al. | 521/64 |
| 6,074,722 A * | 6/2000 | Cuccias | 428/107 |
| 6,319,596 B1 | 11/2001 | Kernander et al. | 428/215 |
| 6,712,864 B2 | 3/2004 | Horiuchi et al. | 23/314 |
| 6,979,479 B2 | 12/2005 | Lavan | 428/1.1 |
| 6,997,981 B1 * | 2/2006 | Coombs et al. | 106/415 |
| 7,354,636 B2 | 4/2008 | Lavan et al. | 428/35.7 |
| 2002/0016118 A1 | 2/2002 | Bebber et al. | 442/286 |
| 2004/0180161 A1 * | 9/2004 | Lavan et al. | 428/35.7 |
| 2005/0167612 A1 * | 8/2005 | Jaffer | 250/458.1 |

FOREIGN PATENT DOCUMENTS

| | | |
|---|---|---|
| JP | 54100478 | 8/1979 |
| JP | 77367/93 | 3/1993 |
| JP | 2002-200684 | 7/2002 |

OTHER PUBLICATIONS

Response as filed Jun. 17, 2010 in U.S. Appl. No. 11/443,327.
Office Action of Jun. 23, 2010 in U.S. Appl. No. 11/443,327.
*Kapton® CR "Corona Resistant Kapton® CR Takes Electrical Insulation Design and Reliability to New Levels"* from http://www.dupont.com/kapton/products/H-54506-1.html (6 pages).
"*Adhesion to Kapton®*" from http://www.dupont.com/kapton/general/adhesion.html (7 pages).
Response as filed Dec. 2, 2009 in U.S. Appl. No. 11/443,327.
Office Action mailed Jul. 6, 2009 in U.S. Appl. No. 11/443,327.
Response as filed Jun. 8, 2009 in U.S. Appl. No. 11/443,327.
Office Action mailed Feb. 10, 2009 in U.S. Appl. No. 11/443,327.
Response as filed Nov. 19, 2008 in U.S. Appl. No. 11/443,327.
Office Action mailed Nov. 14, 2008 in U.S. Appl. No. 11/443,327.
Response as filed Oct. 22, 2008 in U.S. Appl. No. 11/443,327.
Office Action mailed May 30, 2008 in U.S. Appl. No. 11/443,327.
Response as filed Mar. 6, 2008 in U.S. Appl. No. 11/443,327.
Office Action mailed Feb. 11, 2008 in U.S. Appl. No. 11/443,327.
Office Action issued Apr. 6, 2010 in corresponding European Application No. 06814960.8.
Response as filed Aug. 3, 2010 in corresponding European Application No. 06814960.8.
Notice of Grant issued Nov. 19, 2010 in corresponding European Application No. 06814960.8.
Specification as allowed in corresponding European Application No. 06814960.8, Printed Apr. 3, 2010.
Notice of Appeal and Related documents as filed in corresponding U.S. Appl. No. 11/443,327 on Jul. 9, 2010.
Appeal Brief as filed in corresponding U.S. Appl. No. 11/443,327 on Sep. 20, 2010.
Examiner's Answer to Appeal Brief as entered in U.S. Appl. No. 11/443,327 on Oct. 26, 2010.
Reply Brief and Request for Oral Hearing as filed in corresponding U.S. Appl. No. 11/443,327 on Dec. 21, 2010.

* cited by examiner

METALLIZED FLEXIBLE LAMINATE MATERIAL FOR LIGHTER-THAN-AIR VEHICLES

CROSS-REFERENCE TO RELATED APPLICATION

This is a §371 application of International patent application number PCT/US2006/036528 filed Sep. 20, 2006, which claims the benefit of U.S. patent application Ser. No. 11/231,569 filed on Sep. 21, 2005, now abandoned and which is incorporated herein by reference.

TECHNICAL FIELD

The present invention is generally directed to lighter-than-air vehicles. In particular, the present invention is directed to an improved fabric laminate construction used with lighter-than-air vehicles. Specifically, the present invention is directed to a laminate construction that is light weight, possesses high strength characteristics and improved reflectivity, and allows deployment of lighter-than-air vehicles at very high altitudes.

BACKGROUND ART

Lighter-than-air vehicles are used in many different applications. In one well known application companies emblazon their corporate logo or trademark on a lighter-than-air vehicle, sometimes referred to as an airship, and operate the vehicle near large sporting events or in large metropolitan areas. Such advertising effectively generates increased sales. Lighter-than-air vehicles are also used in high altitude applications for the purpose of communications, weather monitoring, scientific research or military surveillance. This includes aerostats, which are held in place by a tether. In these high altitude applications it is known that the higher the vehicle can operate, the more area that can be viewed for surveillance purposes. Moreover, the higher the vehicle is situated, the more difficult it is to detect and destroy the vehicle.

Many known materials for these high altitude lighter-than-air vehicles are limiting inasmuch as they can only withstand a limited range of temperature variation. Moreover, the high altitude vehicles need to be able to withstand ozone degradation, extreme exposure to ultraviolet light, severe expansion and contraction in view of the wide temperature variations experienced in diurnal cycles, and extreme wind and weather forces. And, the lighter-than-air vehicles used for military operations are susceptible to radio frequency detection, laser targeting threats and the like. Of course, the aforementioned properties need to be combined with the standard desired properties for lighter-than-air vehicles, which include light weight, which allows increased payload for the vehicles, and good gas barrier properties to ensure long term deployment of the vehicle. Light weight laminate materials for lighter-than-air vehicles are described in U.S. patent application Ser. Nos. 10/388,772 and 11/443,327, both of which are hereby incorporated by reference. However, the combined properties of thermal management, shear modulus, helium permeability, static electricity dissipation, lightning protection, and long term durability at high altitudes have not previously been demonstrated.

Therefore, there is a need for lighter-than-air vehicles that use laminate or fabric materials with the above desirable properties and that are easy to manufacture and to conform to the desired shape.

SUMMARY OF THE INVENTION

In light of the foregoing, it is a first aspect of the present invention to provide a metallized flexible fabric laminate material for lighter-than-air vehicles. Reflective materials are employed to reduce solar energy absorption, thereby enhancing the thermal management of lighter-than-air vehicles.

It is another aspect of the present invention to provide a laminate material comprising at least one monofilament yarn layer, a polymeric film layer adjacent to the at least one monofilament yarn layer, and a metallized coating adjacent to the polymeric film layer.

Yet another aspect of the present invention, which shall become apparent as the detailed description proceeds, is achieved by a laminate material comprising a straight ply monofilament yarn layer, a bias ply monofilament yarn layer secured to the straight ply layer, a polymeric film layer secured to the bias ply yarn layer, and a metal coating layer secured to the polymeric film layer.

A further aspect of the present invention, which shall become apparent as the detailed description proceeds, is achieved by a laminate material comprising a straight ply monofilament yarn layer, a bias ply monofilament yarn layer secured to the straight ply layer, a polymeric film layer secured to the bias ply yarn layer, a metal coating layer secured to the polymeric film layer, optionally a reflectance enhancing layer adjacent to the metallized coating, and a clear film cover layer adjacent to either the reflectance enhancing layer, if present, or the metallized coating layer, wherein the clear film cover layer includes a fluorescent dye.

Yet another object of the present invention is attained by a lighter-than-air vehicle, comprising a hull; the hull comprising a laminate material comprising a straight ply monofilament yarn layer; a bias ply monofilament yarn layer secured to the straight ply layer; a polymeric film layer secured to the bias ply yarn layer; and a metal coating layer secured to the polymeric film layer.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
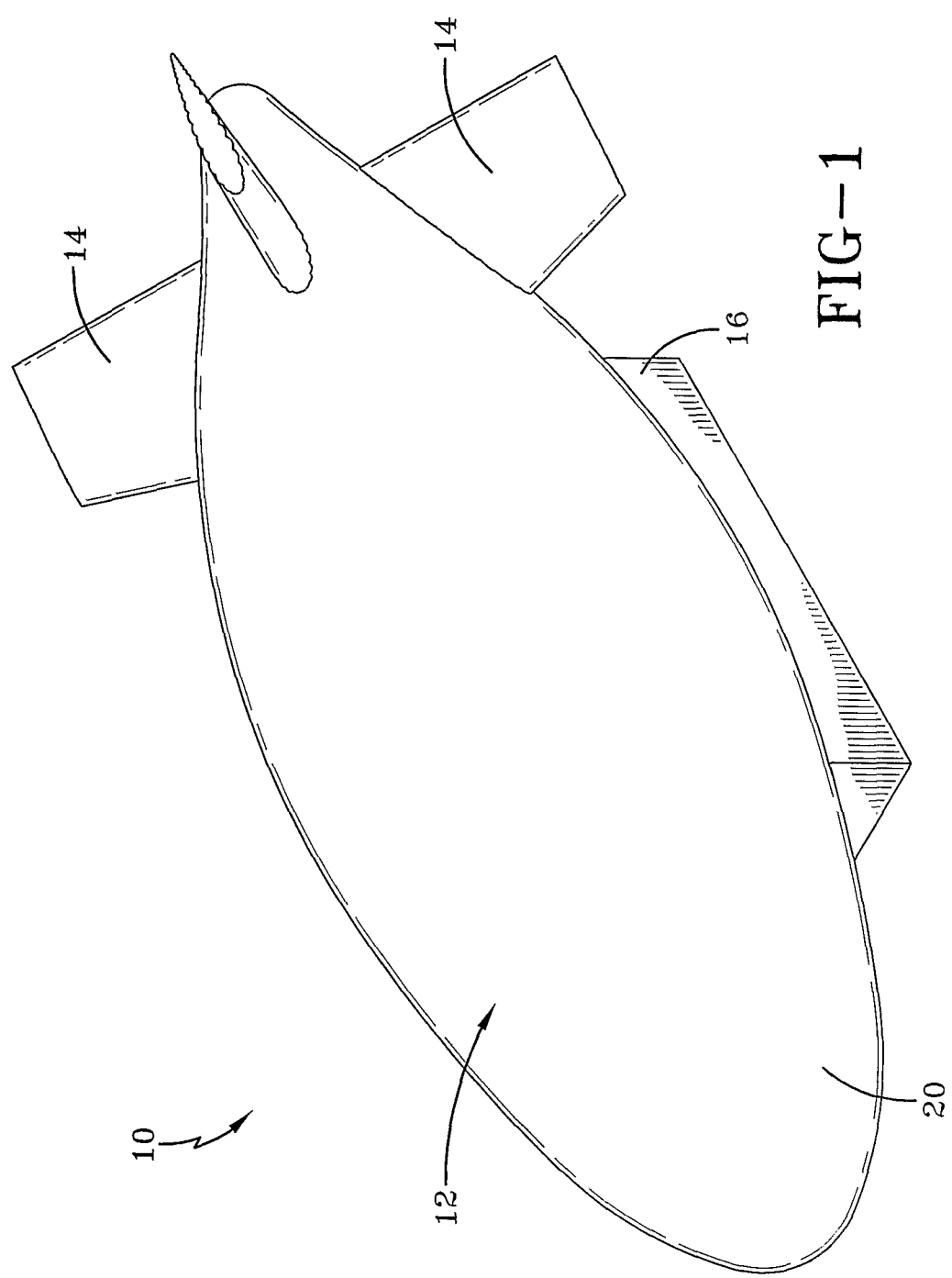
FIG. 1 is a perspective drawing of a lighter-than-air vehicle according to the present invention.

Referring now to the drawings and in particular to FIG. 1 it can be seen that a lighter-than-air vehicle according to the present invention is designated generally by the numeral 10. Although the vehicle 10 is likely to be a lighter-than-air vehicle it will be appreciated that the teachings of the present invention directed to a flexible laminate construction are applicable to any lighter-than-air vehicle such as an aerostat, a blimp, an airship or any similar object that is tethered or untethered. For example, the present invention could be used in hot-air balloons, regular helium balloons, weather balloons, sails, parachutes and any application where a material needs to provide superior properties for use in withstanding the rigors of an outdoor environment. In any event, the vehicle 10 includes a hull 12 with no fins or at least one stabilizing fin 14. If no fins are provided it is likely that a stabilizing element such as a vectored fan may be used. Although an oblong shape is shown for the hull, it will be appreciated that any shape—sphere, ellipse, parabolic, tear-drop, etc—could be used. The vehicle 10 may carry a payload 16 which may include personnel, surveillance devices, weather monitoring equipment, communications equipment, scientific research instrument and the like. The size of the payload generally varies in accordance with the size of the vehicle. The payload may be carried externally (as shown), internally or incorporated into the material such as for radar transmit/receive applications.

The vehicle 10 is constructed with an enclosing material that has many desirable properties. In general, these desirable properties are tear resistance, creep resistance, high strength, and light weight, which allows for an increase in payload size, and the ability to withstand extreme temperature and pressure variations. In view of these wide temperature and pressure variations the material needs to be flexible in many conditions. It is also desirable that the laminate material be ozone and ultraviolet light resistant and have the necessary gas permeability characteristics. Resistance to tearing caused by bullets, punctures and the like is beneficial. It is desirable for the laminate material to have high altitude capabilities. It is believed that the constructions presented herein allow the vehicle 10 to operate at altitudes of within the troposphere and stratosphere. In certain embodiments, the enclosing material of vehicle 10 exhibits good thermal management and shear modulus, and is able to dissipate static electricity and provide lightning protection.

Figure 2:
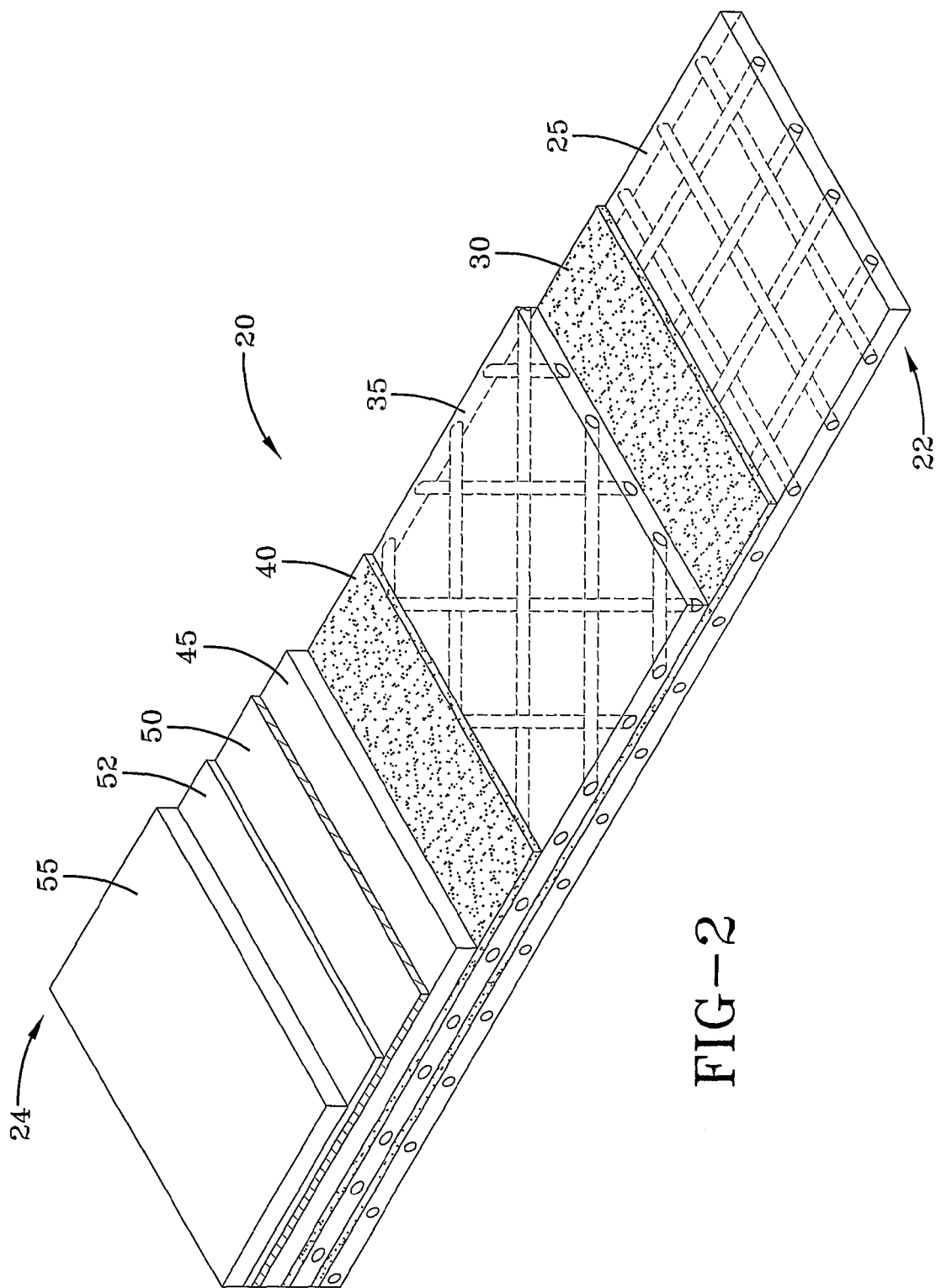
FIG. 2 is a perspective drawing of a laminate material in cross-section according to the present invention.

As best seen in FIG. 2, a laminate material according to one embodiment of the present invention is designated generally by the numeral 20. The material 20 has an interior surface 22 and an exterior surface 24, which is opposite the interior surface 22. Laminate material 20 includes at least one monofilament yarn layer 25, a film layer 45, and a metallized coating 50. Other layers may also be included. The construction of the laminate material 20 will be described in general and then the various properties that each layer of material provides will be discussed in detail.

A monofilament yarn layer 25 forms the interior surface 22. An adhesive layer 30 is applied between a first yarn layer 25 and a second yarn monofilament yarn layer 35. An adhesive layer 40 is applied between yarn layer 35 and a film layer 45. Film layer 45 is preferably metallized. In other words, a metal coating is applied to film layer 45 to form metal coating layer 50. Metal coating layer 50 is adhered to the outer facing surface of film layer 45, and yarn layer 35 is adhered to the inner surface of film layer 45. Clear film cover layer 55 may be adhered to metal coating layer 50. Cover layer 55 may also form the exterior surface 24.

In one or more embodiments, layer 25 may be described as a straight ply. By "straight ply" it is meant that the yarns are oriented at about 0 and 90 degrees to each other, and substantially parallel with the circumferential and axial directions of the airship hull. In certain embodiments, straight ply layer 25 provides the primary strength requirements for the airship structure.

The type of monofilament yarn employed in layer 25 is not particularly limited. Commercially available monofilament yarns include polyamides, polyesters, aramids, liquid crystal polymers, carbon, polybenzoxazole, and ultrahigh molecular weight polyethylene. In certain embodiments, a high tenacity yarn such as carbon, or those designated as M5® (Magellan Systems/DuPont), Vectran,™ Zylon,™ Dyneema,™ and Spectra™ may be employed. In one embodiment, the liquid crystal polymer fiber of layer 25 includes Vectran™ or an equivalent material.

In one or more embodiments, straight ply layer 25 includes a woven fabric that has warp and fill yarns much like a cloth material. The liquid crystal polymer fiber yarns are advantageous in that they are strong yet light weight. A wide range of strengths are possible. Indeed, in one embodiment, the warp direction of straight ply layer 25 has a tensile strength of from about 200 to about 2000 lbs. per inch and in the fill direction a tensile strength of from about 120 to about 1200 lbs. per inch. The liquid crystal polymer fiber material has also excellent creep resistance and flex fatigue resistance. The weave pattern may provide intermittent gaps or periodic groups of bundled yarns for the purpose of reducing the overall weight of the laminate and to stop tearing in the event a bullet or other projectile punctures the laminate.

The at least one monofilament yarn layer may be woven or non-woven. Therefore, in another embodiment, yarn layer 25 is non-woven. For example, the warp and fill yarns of layer 25 are layered and stitched, or knitted, together, rather than woven together. The yarns of the non-woven layer may have a multi-axial or random orientation.

In one or more embodiments, laminate material 20 further includes yarn layer 35. The type of monofilament employed in layer 35 is not particularly limited, and may be selected from any of the monofilaments described hereinabove for yarn layer 25. In one embodiment, layer 35 includes Vectran™ or an equivalent material.

In certain embodiments, yarn layer 35 includes a woven or non-woven fabric that has warp and fill yarns as described for yarn layer 25. In one embodiment, yarn layer 35 may be stitch-bonded or knitted to yarn layer 25 to eliminate the need for adhesive layer 30. It will be appreciated that the layers 25 and 35 may use any warp/fill pattern that maximizes strength while minimizing weight. Moreover, the layers 25 and 35 are not enclosed or embedded in any type of carrier material that would otherwise limit the flexibility, tear, or strength properties of the yarns used in the layers.

In one or more embodiments, layer 35 may be described as bias ply. By "bias ply" it is meant that the warp and fill yarns are oriented at an angle of from about 30 to about 60 degrees to the warp and fill yarns of straight ply layer 25. In certain embodiments, bias ply layer 35 provides shear modulus and tear strength for the airship structure.

As described above for one or more embodiments of the present invention, layer 25 is or includes a non-woven layer in which the yarns have a multi-axial or random orientation. In this embodiment, yarn layer 35 is optional. Examples of commercially available non-woven random fiber orientation materials include TYVEK® by E. I. Dupont and REEMAY® from Reemay, Inc.

Film layer 45 may include any polymeric film. In one or more embodiments, film layer 45 includes a high modulus film, such as polyamide, liquid crystal polymer, polyethylene teraphthalate (PET), polyethylene napthalate (PEN), and polyimide films. Examples of polyimide films include Kapton® or equivalent material. In general, modulus is a measure of resistance to extension of the fiber or the ratio of change in stress to the change in strain after the crimp has been removed from the fiber. An easily extensible fiber or film has low modulus. In certain embodiments, the high modulus film exhibits a tensile modulus of at least about 218,000 psi, in other embodiments, the tensile modulus is at least about 261,000 psi, in other embodiments, the tensile modulus is at least about 290,000 psi.

In one or more embodiments, polymeric film layer 45 functions as a gas barrier for retaining helium or the like. In certain embodiments, polymeric film layer 45 includes a high modulus film, and provides excellent bias modulus and is also an excellent gas barrier material to hold the preferred lighter-than-air material, such as helium, within the hull construction.

The thickness of polymeric film layer 45 is not particularly limited. In one embodiment, film layer 45 is from about 0.3 to about 1 mils in thickness.

Metal coating layer 50 is adhered to the outer surface of polymeric film layer 45. Suitable metals include highly reflective metals such as silver and aluminum. In one or more embodiments, metal coating layer 50 includes aluminum. Aluminum coated polyimide films are commercially available from Sheldahl Technical Materials of Northfield, Minn. Alternatively, polymeric film layer 45 may be coated with metal films and foils via processes generally known in the art. Processes to apply metals to Kapton® without adhesives are known, for example by vacuum metallization and sputtering techniques.

The thickness of metal coating layer 50 is not particularly limited, but should be sufficient to prevent transmittance of solar radiation. The coating may be in the form of a thin foil or vacuum deposited film. In one or more embodiments, metal coating layer 50 is applied to a thickness of from about 800 to about 1200 angstroms, and in one embodiment, metal coating layer 50 is applied to a thickness of about 1000 angstroms.

One purpose of the metal coating is to reflect solar radiation for thermal management. Other purposes of the metal coating are to dissipate local static charge buildup, reduce helium permeability, and reduce damage from lightning strikes.

Reflectance enhancing layer 52 may be adhered to metal coating layer 50. Reflectance enhancing layer 52 may include a polymer film such as 3M photonic filter films, or dielectric materials such as titanium dioxide, silicon dioxide, or hafnium dioxide. Layer 52 may enhance reflectance and/or provide a notch reflector for a specific band width of solar radiation. When employed, the polymer or dielectric coating 52 may be applied to a quarter-wavelength optical thickness (QWOT) or increments thereof. QWOT techniques include the process of applying successive layers of materials of differing refractive indexes, thereby increasing the reflectivity of the coating. The materials in the layers, the thicknesses of the layers, and the indices of refraction of the layers may be chosen to selectively reflect solar radiation within a certain wavelength range.

Clear film cover layer 55 may be adhered to metal coating layer 50. When reflectance enhancing layer 52 is present, clear film cover layer 55 may be adhered to reflectance enhancing layer 52. Clear film cover layer 55 may include any film that is resistant to ozone and ultraviolet radiation. Useful films also include corrosion protector films. Examples of suitable films include polyvinylidene fluoride.

By "clear" is meant that the film does not contain substantial amounts of pigments or solid materials that would cause the film to appear cloudy or opaque, or otherwise decrease the reflectivity of the metal coating layer.

In one or more embodiments, film cover layer 55 further includes a fluorescent dye. Any fluorescent dye that does not make the film cloudy or opaque, or otherwise detrimentally affect the properties of the film, may be used. Examples of fluorescent dyes include commercially available optical brighteners. In one embodiment, the fluorescent dye includes an optical brightener selected from the group consisting of carbocycles such as distyrylbenzenes, distyrylbiphenyls, divinylstilbenes, and triazinylaminostilbenes, stilbenyl-2H-triazoles such as stilbenyl-2H-naphtho[1,2-d]triazoles, and bis(1,2,3-triazol-2-yl)stilbenes, benzoxazoles such as stilbenylbenzoxazoles, and bis(benzoxazoles), furans, benzo[b]furans such as bis(benzo[b]furan-2-yl)biphenyls, benzimidazoles such as cationic benzimidazoles, 1,3-diphenyl-2-pyrazolines, coumarins, naphthalimides, and 1,3,5-triazin-2-yl derivatives. In one embodiment, the fluorescent dye includes a benzoxazolylthiophen.

In one or more embodiments, the fluorescent dye is present in an amount of from about 200 to about 500 parts per million by weight, based upon the total weight of the clear film cover layer.

In one embodiment, the fluorescent dye can be used in an inspection of film cover layer 55 to detect imperfections or damage in the cover layer. For example, ultraviolet or black light can be directed onto the laminate material. Areas that do not fluoresce indicate possible gaps or discontinuities in the cover layer.

Figure 3:
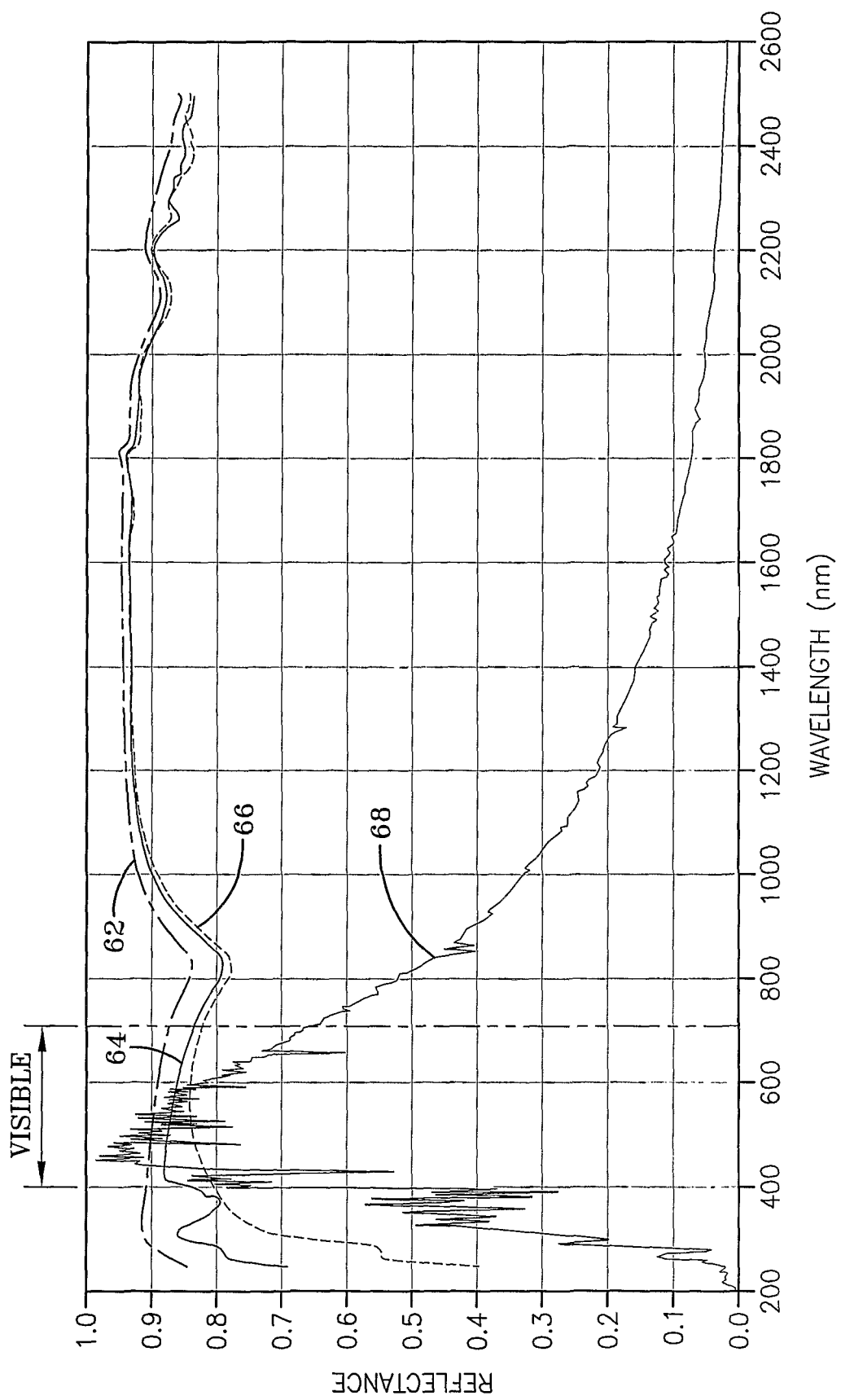
FIG. 3 is a graphical representation of reflectance of layers of various materials over a range of wavelengths.

In certain embodiments, the fluorescent dye increases the reflectivity of the film cover layer, and the overall reflectivity of the metallized laminate material. In this regard, reference is made to FIG. 3, which is a graphical representation of reflectivity over a range of wavelengths. Curve 62 represents the reflectance of a layer of an aluminum coated polyimide film. Curve 66 represents the reflectance of a laminate containing a layer of PVDF over an aluminum coated polyimide film. Curve 64 represents the reflectance of a laminate that is the same as for Curve 66, but where the PVDF layer includes a fluorescent dye. Curve 68 represents the relative solar irradiance at air mass zero (AMO). It can be seen that the maximum solar irradiance occurs at about 450 nanometers (nm).

From this data, it can be determined that the reflectivity of the aluminum coated polyimide film is about 0.899. Adding the layer of PVDF decreases the reflectivity to about 0.838. The addition of a fluorescent dye to the PVDF improves reflectivity to about 0.865, which is an increase of about 3.2 percent over the PVDF without the dye.

In certain embodiments, the film cover layer also enhances thermal control of the vehicle and reduces its infrared signature. In other words, the metal layer reflects 85-95% of solar radiation in the ultraviolet, visible, and near infrared regions of the solar spectrum, while the PVDF or other polymer in the film cover layer acts as an emitter in the mid to far infrared region to minimize heat build-up in the fabric hull material. Advantageously, one or more fluorescent dyes can be selected to enhance the reflectivity in selected regions of the electromagnetic spectrum. For example, a blue dye could be selected to enhance reflectivity of radiation in the range of 450-550 nm, a green dye could be selected to enhance reflectivity of radiation in the range of 500-600 nm, a red/orange dye could be selected to enhance the reflectivity of radiation in the range of 550-600 nm, or a far red dye could be selected to enhance the reflectivity of radiation in the range of 600-700 nm.

Film cover layer 55 may be adhered to metal coating layer 50 or reflectance enhancing layer 52 by use of an adhesive, such as a thermoplastic or thermoset adhesive. Alternatively, film cover layer 55 may be directly cast onto metal coating layer 50 or reflectance enhancing layer 52 by means generally known in the art. Therefore, in one or more embodiments, no adhesive layer is necessary between film cover layer 55 and metal coating layer 50 or reflectance enhancing layer 52. In one or more embodiments, the film cover material provides excellent ultraviolet and ozone protection while allowing reflectance of solar radiation from metal coating layer 50.

One or more layers 25, 35, 45 and 55 are bonded to one another with adhesive layers. Suitable adhesives include thermoplastic and thermosetting adhesives. Specific examples of adhesives include polyurethane adhesives that retain flexibility at low temperatures. The adhesives may be loaded with reinforcing fibers or inorganic fillers to enhance mechanical properties. Inorganic fillers include carbon black, fumed silica, and carbon nanotubes.

The adhesive material bonds the layers to one another and may fill in any pin holes or gaps that may be encountered. In one or more embodiments, the yarn layers are laminated such that penetration of the adhesive into the layers is minimized, and fabric stiffness or reduction in fabric tear strength is avoided. More specifically, the adhesive may be laid onto the surface of the yarn layers and is not embedded into the yarn.

As will be appreciated, the hull 12 and fins 14 are typically not made of a single piece of the laminate material 20. Accordingly, strips or patterns (gores) of the material are adjoined to one another while still providing all the properties of the laminate material. The method of joining strips is not particularly limited. In one or more embodiments, a butt joint configuration is used, such as that described in copending U.S. patent application Ser. No. 10/388,772, which is hereby incorporated by reference in its entirety. In other embodiments, other methods are used, such as sewing, splicing, adhesive tape, and the like.

Based on the foregoing, the advantages of the present laminate material construction are readily apparent. In particular, the present constructions provide for high strength and low weight characteristics which allow for maximum altitude of the lighter-than-air vehicle while providing light weight construction to increase the amount of payload that can be carried by the vehicle 10. In certain embodiments, the weight of the yarn layers can be reduced because less stress is placed on the laminate when heat management and reflectivity is improved due to the presence of a fluorescent dye in the clear film cover layer. In these embodiments, the laminate material weighs less than about 7.5 ounces per square yard.

Indeed, in one or more embodiments, the laminate or material weighs less than 11 ounces per square yard. The combination of the materials provides excellent permeability to retain the lighter-than-air gas. The present invention is also advantageous in that the materials are flexible and can withstand wide temperature variations ranging anywhere from −130° F. to +158° F. In certain embodiments, the metallized polyimide film provides a helium barrier, adds to shear modulus, and protects the cloth layers from ozone and ultra violet radiation. The metallized film improves thermal management and shear modulus, while the bias ply layer also improves shear modulus and tear strength.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A laminate material suitable for a hull of a lighter-than-air vehicle able to reach tropospheric and stratospheric heights comprising:
   at least one monofilament yarn layer;
   a polymeric film layer adjacent to said at least one monofilament layer;
   a metallized coating adjacent to said polymeric film layer opposite said at least one monofilament yarn layer; and
   a clear film cover layer adjacent to said metallized coating wherein said clear film cover layer forms an exterior of the hull, said clear film cover layer comprising a fluorescent dye, wherein said metallized coating reflects solar radiation in the ultraviolet, visible and near infrared regions, said clear film cover layer acts as an emitter of solar radiation in the mid to far infrared regions and said fluorescent dye enhances reflectivity so as to minimize heat build-up in the laminate material.

2. The laminate material according to claim 1, wherein said film cover layer comprises polyvinylidene fluoride.

3. The laminate material according to claim 1, wherein said fluorescent dye comprises an optical brightener selected from the group consisting of carbocycles, stilbenyl-2H-triazoles, benzoxazoles, furans, benzo furans, benzimidazoles, 1,3-diphenyl-2-pyrazolines, coumarins, naphthalimides, and 1,3,5-triazin-2-yl derivatives.

4. The laminate material according to claim 1, wherein said film cover layer comprises from about 200 to about 500 ppm by weight of a fluorescent dye, based upon the total weight of the clear film cover layer.

5. The laminate material according to claim 1, further comprising:
   a first ply yarn layer; and
   a second ply yarn layer.

6. The laminate material according to claim 5, wherein said first ply yarn layer is a woven, non-woven, knit or stitch-bonded construction having warp yarns and fill yarns.

7. The laminate material according to claim 5, wherein said second ply yarn layer is a woven, non-woven, knit or stitch-bonded construction having warp yarns and fill yarns.

8. The laminate material according to claim 5, further comprising an adhesive disposed between said yarn layers.

9. The laminate material according to claim 8, further comprising another adhesive disposed between said second ply yarn layer and said polymeric film layer.

10. The laminate material according to claim 9, wherein said adhesives are selected from a group consisting of thermoplastic adhesives and thermosetting adhesives.

11. The laminate material according to claim 10, wherein said adhesive further comprises reinforcing fiber or inorganic filler.

12. The laminate material according to claim 1, wherein said at least one monofilament yard layer comprises:
   a straight ply monofilament yarn layer and;
   a bias ply monofilament yarn layer secured to said straight ply layer wherein said polymeric film layer is secured to the bias ply yarn layer;
   a metal coating layer secured to the polymeric film layer.

13. The laminate material according to claim 12, further comprising:
   thermoplastic or thermosetting adhesive disposed between said straight ply layer and said bias ply layer, and between said bias ply layer and said polymeric film layer.

14. The laminate material according to claim 13, wherein said adhesive is a polyurethane.

15. The laminate material according to claim 12, wherein said straight ply layer includes a woven or non-woven construction having warp yarns and fill yarns.

16. The laminate construction according to claim 12, wherein said straight ply monofilament yarn layer includes polyamide, polyester, aramid, liquid crystal polymer fiber, carbon, polybenzoxazole, ultrahigh molecular weight polyethylene, or a mixture thereof.

17. The laminate construction according to claim 12, wherein said straight ply monofilament yarn layer includes a liquid crystal polymer fiber.

18. The laminate material according to claim 12, wherein said bias ply monofilament yarn layer includes a woven construction having warp yarns and fill yarns.

19. The laminate construction according to claim 12, wherein said bias ply monofilament yarn layer includes polyamide, polyester, aramide, liquid crystal polymer fiber, carbon, polybenzoxazole, ultrahigh molecular weight polyethylene, or a mixture thereof.

20. The laminate construction according to claim 12, wherein said bias ply layer includes a liquid crystal polymer fiber.

21. The laminate material according to claim 12, wherein the polymeric film includes a polyimide.

22. The laminate material according to claim 12, wherein said metal coating layer comprises one or more of silver and aluminum.

23. The laminate material according to claim 12, further comprises a reflectance enhancing layer adhered to said metal coating layer, wherein said reflectance enhancing layer comprises a multi-layer polymer film or dielectric film selected from titanium dioxide, silicon dioxide, or hafnium dioxide, and wherein said clear film cover layer is secured to said reflectance enhancing layer.

24. The laminate material according to claim 1, the laminate material can withstand temperature variations ranging from −130° F. to +158° F.

25. A lighter-than-air vehicle able to reach tropospheric and stratospheric heights constructed with a laminate material, comprising:
a hull;
said hull comprising at least one piece of laminate material having an interior surface and an exterior surface comprising:
a straight ply monofilament yarn layer forming said interior surface;
a bias ply monofilament yarn layer secured to said straight ply layer;
a polymeric film layer secured to said bias ply layer;
a metal coating layer secured to said polymeric film layer opposite said bias ply monofilament yarn layer; and
a clear film cover layer adjacent to said metallized coating wherein said clear film cover layer forms the hull exterior, said clear film cover layer comprising a fluorescent dye, wherein said metal coating layer reflects solar radiation in the ultraviolet, visible and near infrared regions, said clear film cover layer acts as an emitter of solar radiation in the mid to far infrared regions and said fluorescent dye enhances reflectivity so as to minimize heat build-up in the laminate material.

26. The vehicle according to claim 25, wherein said laminate further comprises:
polyurethane adhesive disposed between said straight ply layer and said bias ply layer, and between said bias ply layer and said polymeric film layer.

27. The vehicle according to claim 25, wherein the metal coating layer comprises one or more of silver and aluminum.

28. The vehicle according to claim 25, wherein said straight ply layer is a woven, non-woven, knit or stitch-bonded construction having warp yarns and fill yarns.

29. The vehicle according to claim 25, wherein said bias ply layer is a woven, non-woven, knit or stitch-bonded construction having warp yarns and fill yarns.

30. The vehicle according to claim 25, wherein said polymeric layer comprises a polyimide.

31. The vehicle according to claim 25, further comprising a reflectance enhancing layer adhered to and disposed between said metal coating layer and said clear film cover layer.

32. The vehicle according to claim 31, wherein said reflectance enhancing layer is applied in increments of quarter-wave optical thickness to selectively reflect solar radiation with a certain wavelength range.

33. The vehicle according to claim 25, wherein the laminate material can withstand temperature variations ranging from −130° F. to +158° F.

34. The laminate material according to claim 1, wherein said metallized coating has a thickness up to about 1200 angstroms.

35. The vehicle according to claim 25, wherein said metal coating layer has a thickness up to about 1200 angstroms.

* * * * *

UNITED STATES PATENT AND TRADEMARK OFFICE
CERTIFICATE OF CORRECTION

PATENT NO.       : 8,524,621 B2
APPLICATION NO.  : 11/991499
DATED            : September 3, 2013
INVENTOR(S)      : Liggett et al.

Page 1 of 1

It is certified that error appears in the above-identified patent and that said Letters Patent is hereby corrected as shown below:

In the Claims

In Column 8, line 17 (Claim 3, line 4) the word "benzo furans" should read --benzo[b]furans--.

Signed and Sealed this
Twenty-seventh Day of May, 2014

Michelle K. Lee
*Deputy Director of the United States Patent and Trademark Office*